US006976299B2

(12) United States Patent
Seigneur

(10) Patent No.: US 6,976,299 B2
(45) Date of Patent: Dec. 20, 2005

(54) STUMP TREATMENT GUIDE BAR

(75) Inventor: Christopher Seigneur, West Linn, OR (US)

(73) Assignee: Blount, Inc., Portland, OR (US)

( * ) Notice: Subject to any disclaimer, the term of this patent is extended or adjusted under 35 U.S.C. 154(b) by 207 days.

(21) Appl. No.: 10/631,147

(22) Filed: Jul. 31, 2003

(65) Prior Publication Data

US 2005/0022394 A1 Feb. 3, 2005

(51) Int. Cl.[7] .................................................. B23P 11/00

(52) U.S. Cl. ....................... 29/434; 29/890.09; 29/219; 29/890.12; 30/123.3; 30/383; 83/169

(58) Field of Search ............................... 29/434, 455.1, 29/218, 219, 235, 890.09, 890.12, 890.144, 29/888.06; 83/14, 22, 169; 30/123.4, 123.3, 30/383

(56) References Cited

U.S. PATENT DOCUMENTS

| | | | | |
|---|---|---|---|---|
| 5,050,303 A | * | 9/1991 | Sinclair et al. | 30/123.4 |
| 5,056,224 A | * | 10/1991 | Seigneur | 30/123.4 |
| 5,634,273 A | * | 6/1997 | Michels et al. | 30/123.4 |
| 5,669,140 A | * | 9/1997 | Tsumura | 30/123.4 |
| 6,397,452 B1 | | 6/2002 | Frosberg et al. | |
| 6,427,342 B1 | | 8/2002 | Breitbarth et al. | |
| 6,643,933 B2 | | 11/2003 | Seigneur | |

* cited by examiner

*Primary Examiner*—David P. Bryant
*Assistant Examiner*—Stephen Kenny
(74) *Attorney, Agent, or Firm*—Schwabe, Williamson & Wyatt

(57) ABSTRACT

A tree harvesting guide bar adapted for treating stumps with a treatment material as the tree is being harvested is provided, and more particularly a valve arrangement for enabling connection of the guide bar inlet to treatment material sources on a variety of different harvesting machines is disclosed, such that the inlet not connected to the treatment material source does not need to be independently and manually plugged to prevent undesirable outflow.

17 Claims, 2 Drawing Sheets

STUMP TREATMENT GUIDE BAR

FIELD OF THE INVENTION

This invention relates to a guide bar for tree harvesting machines, the bar having a perforated conduit embedded in the opposing sides of the bar, the conduits connectable to a stump treatment material source and, more particularly, it relates to a valve arrangement for adapting the bar to different tree harvester machines by enabling connection to conduit from either side of the bar.

BACKGROUND

A basic guide bar adapted for treating stumps is disclosed in commonly owned U.S. Pat. No. 6,397,452. That patent illustrates the provision of conduits that are seated in channels formed in the opposing sides of the bar. It further illustrates the connection of the fluid source to the conduit on the underside of the bar (understanding that either side may be the underside and the bar is typically inverted over time so as to extend the wear life of the bar).

What is not evident from the above patent or prior art is that different tree harvesting machines have different routes for connecting the treatment material source to the guide bar. One route directs the flow of liquid to the top of the bar and the other directs the flow of liquid to the bottom of the bar, both feeding the conduit on the underside of the bar.

As shown in the partial cross-sectional view of a guide bar of FIG. 2, currently, to accommodate both feeding routes, receiving inlets 234, 236 are provided at both sides of bar 222 and penetrate conduit 240. As shown, side 244 is the under side where treatment material will be dispersed through perforations 246 in conduit 240. Plug 230 prevents the treatment material from escaping through near end 232 of conduit 240. Currently, when a bar is purchased, the purchaser must determine which of the inlet 234, 236 is the correct inlet for his or her machine and the opposing side inlet to that conduit needs to then be sealed, otherwise it becomes an outlet for the treatment liquid. Such sealing has been heretofore achieved by providing the bar purchaser with a plug sized to fit inlets 234, 236, which is usually manually inserted in the unused inlet.

Inserting the plug into the inlet is an undesirable, time-consuming and oftentimes awkward task. And, if the plug is improperly inserted or if the plug is dropped, lost or not inserted at all, the user will experience an undesired outflow of treatment material onto the machine and ground. This can render the flow of the treatment material onto the stump surface insufficient, and can also increase costs.

The present invention is directed to the resolution of the above-described problem whereby the insertion of inlet plugs is avoided.

BRIEF DESCRIPTIONS OF THE INVENTION

Whereas the inlets for the conduit are directly opposite each other, whereas they are typically located near the inner end of the conduit and whereas the ends of the conduits are usually sealed by plugs at the point of manufacture, one preferred embodiment includes modification of the end plugs at the inner ends of the conduits so as to incorporate a check valve as a part of the end plug. The check valves may be open or closed biased, and are reactive to the pressure applied by the treatment material as it is introduced to an inlet.

In some embodiments, the end plug may carry the check valve. In a closed biased setup, a portion of the valve opens in response to the treatment material flow, thereby allowing the treatment material into the conduit, while a portion of the valve remains closed at the opposed inlet to prevent unwanted outflow. In an open biased valve configuration, the force of the treatment material causes the valve to close off the inlet where the treatment material is not being introduced and thus preventing unwanted outflow.

In other embodiments of the present invention, the check valve is not carried by the end plug, but may still have either an open or closed biased setup that is reactive to the introduction of treatment material. For example, a flexible or collapsible layer may be applied adjacent to a portion of the conduit inner wall and covering the opposed inlets. Fluid directed through one of the inlets forces the portion of the layer covering the inlet to collapse, thus allowing the treatment material to flow into the conduit while the portion of the layer overlaying the opposed inlet remains closed preventing outflow. Further versions are contemplated and several are illustrated and described in the detailed description that follows and which have reference to the accompanying drawings.

BRIEF DESCRIPTION OF THE DRAWINGS

The invention is illustrated by way of example and not by way of limitation in the figures of the accompanying drawings, in which the like references indicate similar elements and in which.

DETAILED DESCRIPTION

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Figure 1:
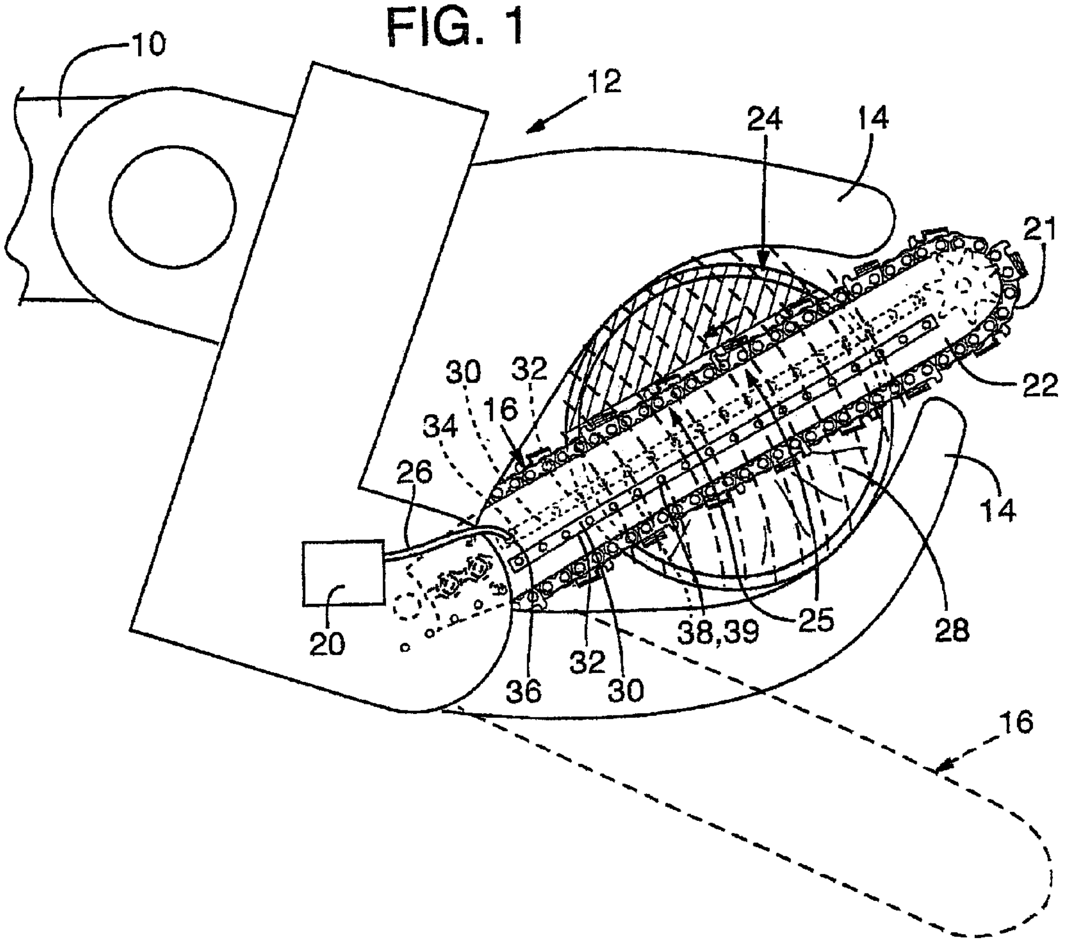
FIG. 1 illustrates a stump treatment guide bar coupled to a tree harvester.

FIG. 1 illustrates an example of a stump treatment guide bar interconnected to a tree harvester. Boom 10 of a tree harvester has a head portion 12 that includes grapples 14 and a cutting assembly 16 pivotally mounted thereon. Cutting assembly 16 includes a cutting chain 21 mounted for driven rotation around a guide bar 22. As the grapples 14 encircle and then grip the trunk of a tree 24, cutting assembly 16 is then pivoted into and through the tree 24 as indicated by arrows 25. As the cutting assembly 16 cuts through the tree 24, the flat underside of bar 22 slides along or in close proximity to the exposed surface 28 of the stump. It is this exposed surface 28 that needs treating.

For treatment of surface 28, a channel 32 may be formed in each of the bar sides (FIG. 1 being a view from the upper side of the bar and the underside channel is shown in dashed lines). A conduit 30 is secured in the channel 32 and is connected to a treatment material source 20 at either opposed inlets 34, 36, depending on which side the tree harvester is configured to dispense such treatment material. As illustrated, source 20 is connected to inlet 36 on the top side of bar 22 by line 26. Again, other harvesters may be configured to interconnect the treatment material source 20 with inlet 34 on the underside of guide bar 22.

Outlet holes or perforations 38 may be formed in conduit 30 and open to the underside of the bar 22. The perforations 38 adapted to direct the treatment material from conduit 30 onto surface 28. It can be appreciated by one skilled in the art, however, that perforations 38 can be formed in conduit 30 at the point of manufacture, or they can be formed by the user to customize the necessary application of treatment material depending, for example, on the material being dispersed and/or the trees being cut.

Figure 3A:
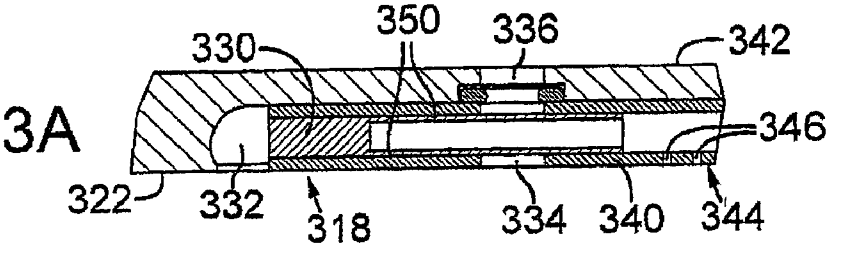
FIGS. 3A and 3B illustrate cross-sectional views of a portion of a guide bar in accordance with a first embodiment of the present invention.
Figure 3B:
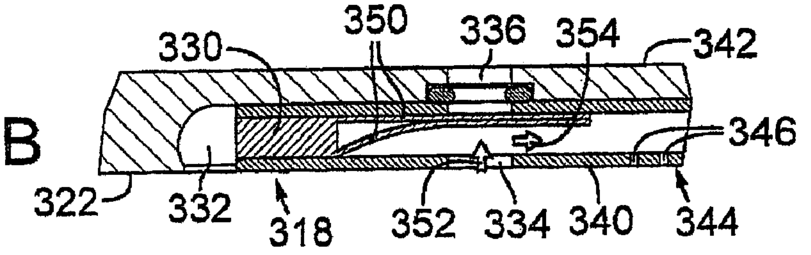

FIGS. 3A and 3B illustrate cross sectional-views of a portion of a guide bar in accordance with a first embodiment of the present invention. Guide bar 322 is similar to those described with respect to FIG. 1, having channel 332 formed therein. Conduit 340 has a near end 318 and an outside end (not shown), and is disposed in channel 332 such that perforations 346 are positioned at or near the underside 344 so treatment material can flow out therefrom and treat the stump exposed surface (not shown, but shown in FIG. 1).

Plug 330 is positioned in the near end 318 of conduit 340 to prevent treatment material from exiting therefrom. Plug 330 carries a check valve 350. As illustrated, check valve 350 is a generally tubular-shaped hollow extension of plug 330 that is substantially pliable or collapsible such that it may conform to the inner surface of conduit 340. The tubular extension 350 extends to a point past the receiving inlets 334, 336. It is preferable that the outer diameter of the tubular extension check valve 350 be substantially the same as the inner diameter of the conduit 340, so that the extensions 350 cover inlets 334, 336, thus creating a closed biased arrangement. It can be appreciated, however, that the outer dimension of the tubular extension could be slightly larger, particularly where the selected material is pliable such that it may deform to fit within conduit 340.

FIG. 3B illustrates the response of the check valve 350 when treatment material is introduced from the source (not shown) through inlet 334. As the treatment material is directed through inlet 334, it causes the portion of check valve 350 that is covering inlet 334 to deflect or collapse inwardly as indicated by directional arrow 352. This deflection in response to the treatment material flow thereby opens inlet 334 and allows the material to flow into conduit 340 and out perforations 346, thereby performing the stump treatment process.

The treatment material is prevented from flowing out of inlet 336 in part because the portion of check valve 350 covering inlet 336 does not deflect inwardly, and thus remains in the closed position. Depending on the pressure at which the treatment material is introduced, the deflecting portion of check valve 350 may also push against the portion of check valve 350 that remains in the closed position over inlet 336, thereby enhancing the seal of inlet 336 and increasing the resistance to undesired outflow.

The arrangement shown in FIG. 3B is one where the tree harvester (not shown) is configured to insert treatment material from the under side 344 of the guide bar 322 through inlet 334. However, check valve 350 will function as described where a tree harvester is used that dispenses treatment material from the top side 342 through inlet 336. In such a case, the portion of check valve 350 that is covering inlet 336 will deflect inwardly thereby allowing treatment material to flow into conduit 340. The presence of the portion of check valve 350 covering inlet 334 will remain in place and prevent outflow of treatment material therefrom.

It can be appreciated by one skilled in the art that the cross-sectional dimension of check valve 350 may also be smaller than the cross-sectional dimension of conduit 340, which would create an open biased arrangement. When the treatment material is introduced, it will cause the deflection of the tubular extension such that it covers the opposing inlet.

Figure 4A:
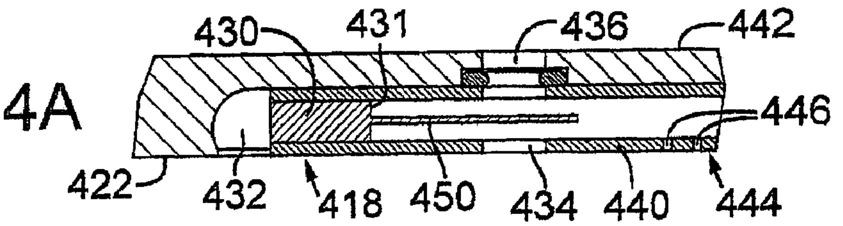
FIGS. 4A and 4B illustrate cross-sectional views of a portion of a guide bar in accordance with a second embodiment of the present invention.
Figure 4B:
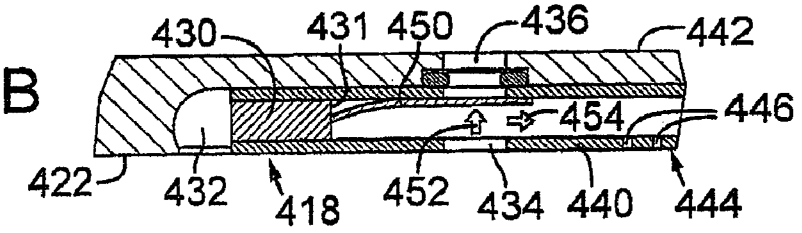

FIGS. 4A and 4B illustrate cross-sectional views of a portion of a guide bar in accordance with a second embodiment of the present invention. As with FIGS. 3A and 3B, Guide bar 422 has channel 432 formed therein. Conduit 440 has a near end 418 and an outside end (not shown), and is disposed in channel 432 such that perforations 446 are positioned at or near the underside 444 to allow treatment material to flow therefrom and treat the stump exposed surface (not shown).

A plug 430 is positioned in the near end 418 of conduit 440 to prevent treatment material from exiting therefrom. Plug 430 carries a check valve 450. Check valve 450 consists of a generally planar flap that extends outward from the inner end 431 of plug 430 in a substantially parallel manner to conduit 440, to a point past the opposing inlets 434, 436. In its neutral position, the flap of check valve 450 generally maintains a substantially similar distance from inlets 434, 436, thus leaving inlets 434, 436 in an open biased position.

As shown in FIG. 4B, when treatment material is directed into inlet 434, check valve 450 deflects toward opposed inlet 436, as shown by arrow 452. When deflected, check valve 450 is forced against inlet 436 thereby sealing it such that undesirable outflow of the treatment material there through is prevented without the need for inserting a plug into inlet 436.

Though check valve 450 is shown to be substantially flat, it can be appreciated by one skilled in the art that the cross-sectional shape of flap portion of the check valve 450 can be varied, while still achieving similar results. For example, the flap cross sectional shape could be more oblong in order to better match the inner curvature of the conduit 440 at the inlets 434, 436 and thus encourage a better seal.

Also, as discussed with FIG. 3B, the illustrated configuration anticipates a tree harvester that is configured to direct treatment material from the under side 444 to inlet 434. However, it can be appreciated that the same result may be achieved if treatment material is directed to inlet 436 on the top side 442. In such a case, though not shown, check valve 450 will deflect in response to introduction of treatment material through inlet 436 thereby forcing the flap of check valve 450 against opposed inlet 434, and thus sealing it to prevent unnecessary outflow.

Figure 5:
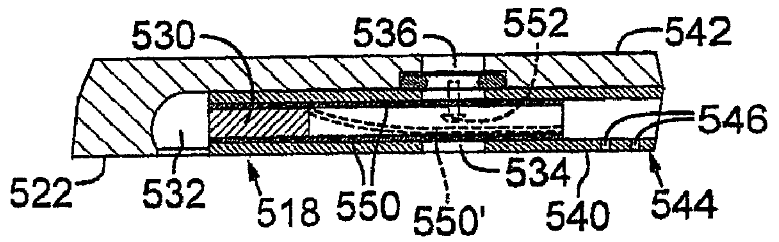
FIG. 5 illustrates a cross-sectional view of a portion of a guide bar in accordance with a third embodiment of the present invention.
Figure 6:
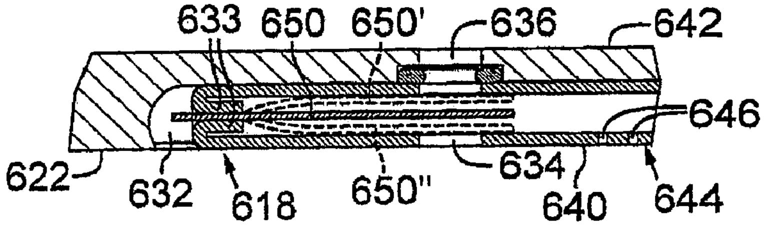
FIG. 6 illustrates a cross-sectional view of a portion of a guide bar in accordance with a fourth embodiment of the present invention.

FIGS. 5 and 6 are cross sectional-views of a portion of a guide bar in accordance with additional embodiments of the present invention where the check valve is not carried by the plug. FIG. 5 illustrates a check valve 550 which operates similar to the tubular extension check valve embodiment shown in FIGS. 3A and 3B, except plug 530 does not carry the check valve 550. Instead, check valve 550 is a flexible layer of deflectable material residing adjacent to the inner wall of conduit 540 at the near end 518. Flexible layer check valve 550 extends past the inlets 534, 536 thereby maintaining a closed bias. When treatment material in directed into inlet 536, for example, the portion of the flexible layer of check valve 550 that covered inlet 536 deflects toward opposed inlet 534, as shown by dashed lines 550' and arrow 552. This allows the treatment material to flow into conduit 540 without flowing out of inlet 534.

Flexible layer check valve 550 can be held into place by plug 530 at the inner end 518. Though not shown, inner end 518 can also be crimped or otherwise sealed to prevent out flow, as well as hold tubular layer check valve 550 in place.

FIG. 6 illustrates another embodiment of a guide bar in accordance with the present invention where the check valve is not carried by the plug. As shown, check valve 650 is similar to and correspondingly functions like the planar flap check valve described in FIGS. 4A and 4B. But, instead of being carried by a plug, the check valve 650 is held in a position between the opposing inlets 634, 636 by the deformation or crimping 633 of near end 618 of conduit 640. Check valve 650 extends from the crimping 633 to a point past inlets 634, 636. When treatment material is directed into conduit 640 through inlet 634 on under side 644, for example, check valve 650 deflects toward opposing inlet 636 as shown by 650', thereby sealing inlet 636 and preventing undesirable outflow. Likewise, if treatment material is directed through inlet 636, check valve 650 will deflect toward opposing inlet 634 as shown by 650", thereby sealing inlet 634 and preventing undesirable outflow.

Check valves described above can be made out of a variety of materials depending on a variety of factors. It is preferable that the check valves be made of a pliable material that will be responsive to the pressures induced by the flow of treatment material. Examples of such a material are many polymer-based rubber materials, including, but not limited to, polyurethane, polypropylene and the like. Finally, it can be appreciated by one skilled in the art that the end of the conduit can be sealed or crimped in a variety of ways in addition to that shown in the figures, without departing from the scope of the invention.

It can also be appreciated that there may be a slight advantage of the closed biased check valve embodiments (i.e., the tubular extension check valve embodiment illustrated in FIGS. 3A and 3B and flexible layer check valve embodiment illustrated in FIG. 5) over the example open biased flap check valve embodiments of FIGS. 4A and 4B, and FIG. 6. The former check valves eliminate the potential need to orient the plug as may be required of the latter flap check valves, i.e., so that the plane of the flap is positioned perpendicular relative to a center line passing through the opposing inlets. Also, the closed biased configuration of the tubular extension check valve and flexible layer check valve embodiments will prevent treatment material from flowing out of the inlets when the treatment material is not being directed to the guide bar from the source (e.g., when moving from one tree to the next).

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A guide bar, comprising:

an elongate bar having inner and outer ends and opposed first and second sides;

a channel provided in at least one of the opposed sides and extending substantially along the length thereof;

a conduit seated in the channel, the conduit having an inner and outer end, the conduit having opposing inlets, the opposing in lets defining passageways into the conduit at a point at or near the inner end, the opposing inlets adapted to receive a treatment material from a source, such that the treatment material is directed into the conduit; and a check valve positioned in the conduit between the opposing inlets, the check valve movable from a first position to a second position, the check valve being responsive to the inflow of the treatment material through one of the opposing inlets whereby one of the opposing inlets is open, to allow treatment material into the conduit, and the other opposing inlet is closed to prevent outflow through the closed inlet.

2. A guide bar as defined in claim 1, wherein an end plug seals the inner end of the conduit and carries the check valve.

3. A guide bar as defined in claim 2 wherein the check valve includes a flap that extends from the end plug to a point in the conduit past the opposing inlets, the flap being responsive to the flow of treatment material such that introduction of the treatment material from one opposing inlet forces the flap against the other opposing inlet, thereby preventing outflow of the treatment material through that opposing inlet.

4. A guide bar as defined in claim 2, wherein the check valve is a collapsible tubular extension of the end plug, the tubular extension keeping the opposing inlets in a closed position, whereby introduction of the treatment material into one opposing inlet forces a portion of the tubular extension to collapse allowing treatment material to flow into the conduit.

5. A guide bar as defined in claim 4, wherein the collapsing portion of the check valve pushes against the portion of the check valve covering the opposing inlet, thereby creating an enhanced seal to prevent outflow through that inlet.

6. A guide bar as defined in claim 1, wherein the check valve is a flexible layer adjacent to an inner walled portion of the conduit and overlying the opposing inlets, whereby a first portion of the flexible layer adjacent to one opposing inlet separates from the inner walled portion of the conduit in response to inflow of the treatment material allowing the treatment material to flow to the conduit, and a second portion of the flexible layer remaining against the opposing inlet preventing the treatment material from flowing out therefrom.

7. A guide bar as defined in claim 6, wherein the separating first portion of the flexible layer of the check valve pushes against the second portion of the flexible layer, thereby creating an enhanced seal to prevent outflow through that inlet.

8. A guide bar as defined in claim 1, wherein the check valve is a flap having a first end and a second end, the first end being secured in the inner end of the conduit and the second end extending from the inner end to a point in the conduit past the opposing inlets, the flap being responsive to the flow of treatment material such that introduction of the treatment material from one opposing inlet forces the flap against the other opposing inlet, thereby preventing outflow of the treatment material through the other opposing inlet.

9. A guide bar as defined in claim 8, wherein the flap has a cross-sectional curvature substantially similar to a cross-sectional curvature of a corresponding inner walled portion of the conduit.

10. A guide bar as defined in claim 1, wherein the conduit further comprises a plurality of perforations adapted for dispersing the treatment material.

11. A guide bar as defined in claim 1, wherein the plurality of perforations are formed by a manufacturer.

12. A guide bar as defined in claim 1, wherein the plurality of perforations are formed by a user.

13. A method for treating stumps, comprising:

providing a guide bar having opposed sides, a conduit adapted for dispersing a treatment material being disposed in at least one side, the conduit having a near end and an outer end, and opposing inlets in the guide bar and conduit at or near the near end;

positioning a check valve in the conduit between the opposing inlets, the check valve movable from a first position to a second position, the check valve being responsive to the inflow of the treatment material through one of the opposing inlets whereby one of the opposing inlets is open, to allow treatment material into the conduit, and the other opposing inlet is closed to prevent outflow through the closed inlet;

coupling one of the opposing inlets to a source for the treatment material; and introducing the treatment material from the source to the coupled opposing inlet, whereby the check valve allows the treatment material to flow into the conduit and prevents outflow of the treatment material through the opposing inlet that is not coupled to the source.

14. The method of treating stumps as defined in claim 13, wherein the check valve includes a flap that extends from the end plug to a point in the conduit past the opposing inlets, the flap being responsive to the flow of treatment material such that introduction of the treatment material from one opposing inlet forces the flap against the other opposing inlet, thereby preventing outflow of the treatment material through that opposing inlet.

15. The method of treating stumps as defined in claim 13, wherein the check valve includes a collapsible tubular extension of the end plug, the tubular extension keeping the opposing inlets in a closed position, whereby introduction of the treatment material into one opposing inlet forces a portion of the tubular extension to collapse allowing treatment material to flow into the conduit.

16. The method of treating stumps as defined in claim 13, wherein the check valve includes a flexible layer adjacent to an inner walled portion of the conduit and overlying the opposing inlets, whereby a first portion of the flexible layer adjacent to one opposing inlet separates from the inner walled portion of the conduit in response to inflow of the treatment material allowing the material to flow to the conduit and a second portion of the flexible layer remaining against the opposing inlet preventing the treatment material from flowing out of that opposing inlet.

17. The method of treating stumps as defined in claim 13, wherein the check valve is a flap having a first end and a second end, the first end being secured in the inner end of the conduit and the second end extending from the inner end to a point in the conduit past the opposing inlets, the flap being responsive to the flow of treatment material such that introduction of the treatment material from one opposing inlet forces the flap against the other opposing inlet, thereby preventing outflow of the treatment material through the other opposing inlet.

* * * * *

UNITED STATES PATENT AND TRADEMARK OFFICE

CERTIFICATE OF CORRECTION

Figure 2:
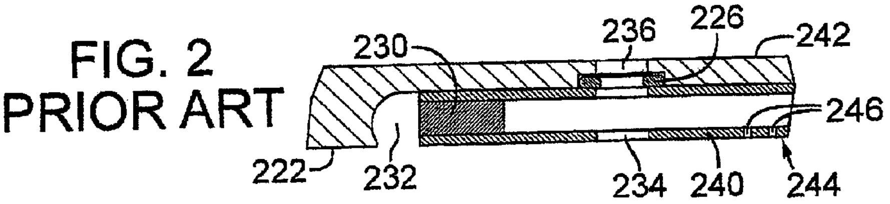
FIG. 2 PRIOR ART
FIG. 2 illustrates a cross section of a portion of a known stump treatment guide bar.

PATENT NO. : 6,976,299 B2 
APPLICATION NO. : 10/631147
DATED : December 20, 2005
INVENTOR(S) : Christopher Seigneur It is certified that error appears in the above-identified patent and that said Letters Patent is hereby corrected as shown below:

In the Figures:
Fig. 1, "39"... should be deleted;
Fig. 2, "226" and "242"... should be deleted;
Fig. 3B, "354"... should be deleted;
Fig. 4B, "454"... should be deleted;
Fig. 5, "522", "532", "542", "544", and "546"... should be deleted;
Fig. 6, "622", "632", "642" and "646"... should be deleted.

Col. 1, line 37 "...inlet 234, 236..." should read --...inlets 234, 236...--.

Col. 3, line 26 "...cross sectional-views..." should read --...cross-sectional views...--;
Col. 3, lines 40-41 "...tubular extension 350..." should read --...tubular extension of check valve 350...--;
Col. 3, line 45 "...extensions 350..." should read --...check valve 350...--;
Col. 4, line 5 "...under side 344..." should read --...underside 344...--;
Col. 4, line 58 "...under side 444..." should read --...underside 444...--;
Col. 4, line 66 "cross sectional-views..." should read --...cross-sectional views...--;
Col. 5, line 29 "...under side 644..." should read --...underside 644...--;
Col. 5, line 31 "...650',...." should read --...650', [boldface] ...--.

Col. 6, line 18 "...in lets..." should read --...inlets...--.

Signed and Sealed this

Twenty-ninth Day of May, 2007

JON W. DUDAS
*Director of the United States Patent and Trademark Office*